July 21, 1959 W. C. RIESTER 2,895,158
WINDSHIELD WIPER MOTOR TRANSMISSION SYSTEM
Filed Aug. 13, 1956 3 Sheets-Sheet 1

INVENTOR.
WILLIAM C. RIESTER
BY
Bean Brooks Buckley + Bean
ATTORNEYS

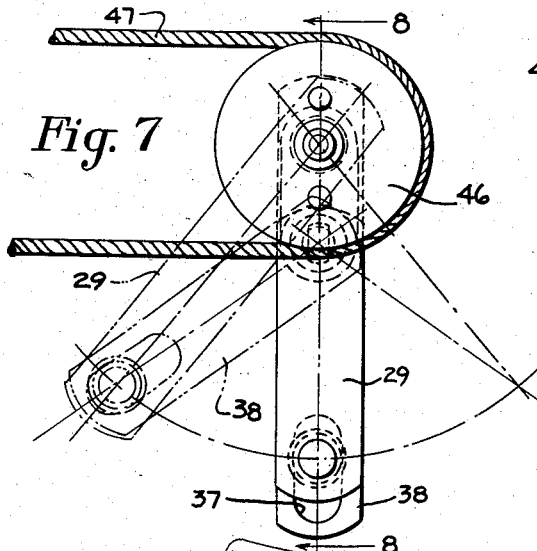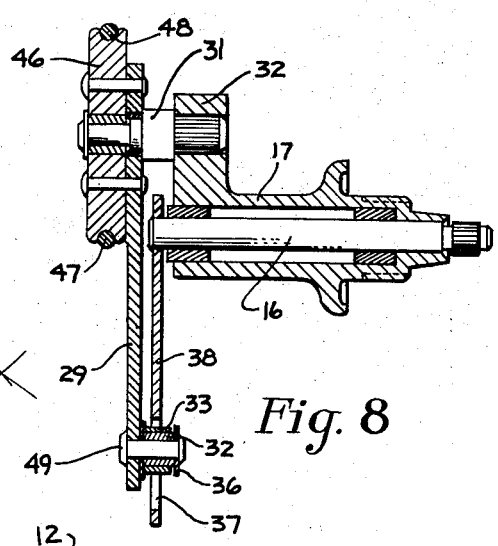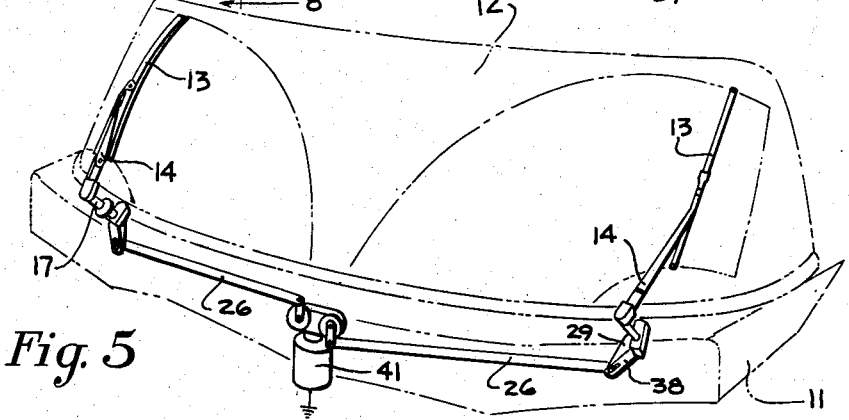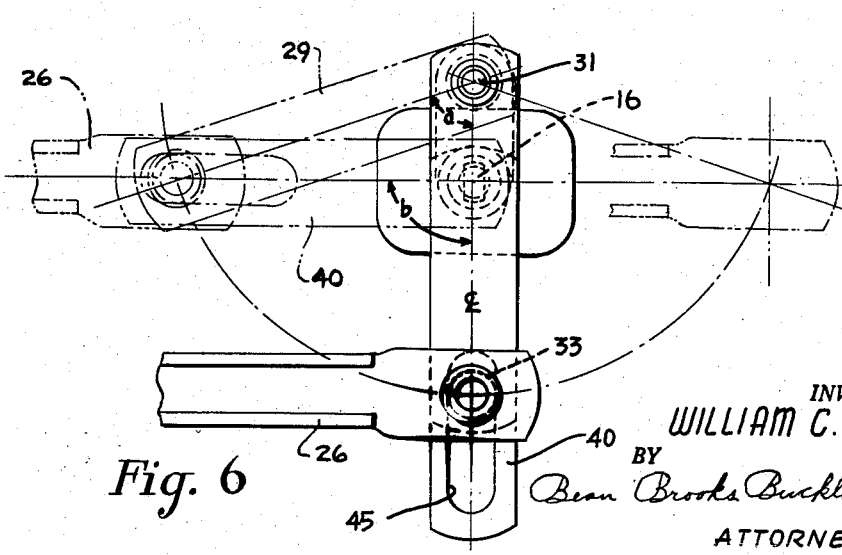

United States Patent Office 2,895,158
Patented July 21, 1959

2,895,158

WINDSHIELD WIPER MOTOR TRANSMISSION SYSTEM

William C. Riester, Buffalo, N.Y., assignor to Trico Products Corporation, Buffalo, N.Y.

Application August 13, 1956, Serial No. 603,692

5 Claims. (Cl. 15—253)

This invention relates to windshield wiper arrangements for use on motor vehicles, and more particularly to a windshield wiper motor transmission system.

The windshield wiper arrangements in motor vehicles of contemporary design generally employ a vacuum, or electrically powered wiper motor, for driving two wipers in synchronism upon the vehicle windshield. The power transmission system between the wiper motor and each wiper drive shaft supporting a wiper, generally involves some form of cable and pulley arrangement, or a connecting rod pivotally affixed to arm or crank members associated with the wiper motor and the wiper drive shaft mechanism. In this connecting rod type of transmission linkage, the motor reciprocated connecting rod had its outer end connected to an arm fixed on the wiper-carrying rockshaft by a fixedly located pivot. This former transmission was satisfactory for operating a wiper over a flat windshield within certain limits, but beyond these limits care had to be given to avoid the rod and crank arm approaching too closely a position of alinement which would lock the two parts against breaking their connecting hinge joint.

With the advent of the more deeply curved wrap-around windshield having a frontal area and flanking lateral areas joined thereto by more sharply curved crest areas, a wider field of vision is provided which necessitates a greater angular sweep of the wipers to wipe not only the frontal area but also to clean the crest and lateral areas.

The present invention concerns both types of transmission systems and represents an improvement whereby a greater torque is developed on the wiper shaft in the positions of its end zones of travel as compared to the torque developed in the earlier transmission above referred to, and further, wherein a wiper arc travel of more than 180° may be achieved in a practical manner i.e., without link locking, or unreasonable stress development, or prohibitive wear. This type of windshield in clear weather affords unobstructed vision forwardly and to the sides of the vehicle as a result of removal of the obstruction of the pillar posts. But in foul weather the clouding of the glass, plus the water unloading of the blades wiping across the frontal section produces a wide side obstruction, commonly referred to as a "ripple post," thus losing the safety feature of the panoramic glass whenever it rains. Heretofore, no rigid bar linkage mechanism has been usable or available with which it has been possible to accomplish the wide-wipe pattern to clear around the crest of the glass curvature with the same degree of blade travel as that of the pulley and cable transmissions, for maintaining the safety of panoramic vision in the rain.

The elements needed in accomplishment of the desired result of safer vision with the rigid bar transmission linkage involve three features:

(1) Increased travel of the pivoted links without locking up, to wipe a pattern of greater scope;

(2) Gearing the power of the motor by torque multiplying levers to make available more torque for pulling the wipers up over the crest of the deeply curved glass; and (3) Mechanically normalizing the blade angle to the changing contour of the glass in traveling from the front over to the changing curvatures on the sides.

To this latter end the instant invention introduced for the first time all three elements including the accomplishment of the blade normalizing action with its shifting of the wiper shaft and its fixedly carried arm axially during the rocking of the wiper shaft in a manner not heretofore made possible whereby the motion transmission parts are caused to transmit the motor torque for both oscillation and endwise movement of the wiper shaft outwardly and inwardly, said arm functioning to hold the blade normalized, i.e. in an attitude slightly dragging, to wipe the changing contour of the glass. Because of improved torque characteristics and increased wiping arc afforded by application of the principles of the invention, it is particularly well suited for use in motor vehicles having the panoramic or wraparound type windshield, which present greater windshield area for wiping as compared with windshields of less curvature.

The panoramic or wrap-around type windshield embodies a frontal area joined at its opposite sides to lateral areas by crest areas of relatively sharper curvature so that the path of the wipers move from the frontal area over the crest area and down over the lateral areas into the wind or slip stream against which the wipers must be returned in an uphill direction. This imposes a greater torque load on the wiper shafts and their driving motor, the shafts being pivotally mounted adjacent the lower edge of the shield. For windshields having more sharply curved crest areas, normalizing mechanisms have been used commercially to maintain the wipers in a normal attitude as they traverse the frontal, crest and lateral areas. The uphill return of each wiper against the crest contour resistance, with or without the normalizing mechanism, imposes a heavier load upon the motor and its transmission mechanism.

It is, therefore, the main object of this invention to provide an improved windshield cleaning system suited for the panoramic or wrap-around contour of that type windshield to secure a greater torque where most needed for maintaining effective unstallable wiping of the windshield throughout the wiping pattern of the blade.

A more specific object of the invention is to provide a power transmission system combined in a windshield wiper arrangement wherein greater torque can be developed at end of wiper movement as compared to torque developed at mid-point of wiper movement.

Another more specific object of the invention is to provide a windshield wiper arrangement wherein a wiping arc of 180° or more can be obtained in a practical manner.

Another more specific object of the invention is that greater variation in the distance between the wiper motor and wiper drive shaft is possible without seriously effecting a predetermined wiping pattern.

These and further objects and features of the invention will become more apparent from the following description and the accompanying drawings wherein:

Fig. 5 is a fragmentary perspective view of a motor vehicle having a windshield wiper arrangement embodying the principles of the invention when used with a wiper motor different from that illustrated in Fig. 1;

Fig. 6 is a view similar to Fig. 2 but illustrating a more extreme amplitude of movement transmitted to the wiper carrying rockshaft;

Fig. 7 is a view illustrating a linkage arrangement embodying the principles of the invention and as applied to a flexible motion transmission system;

Fig. 8 is a section view as seen from line 8—8 in Fig. 7, and

Figure 4:
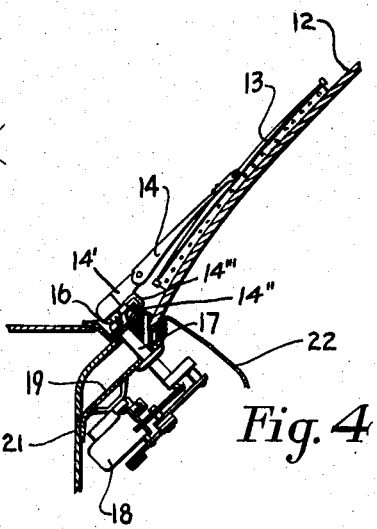
Fig. 4 is a section view as seen from line 4—4 in Fig. 1.

Referring now to the drawings, numeral 11 identifies a motor vehicle having a windshield 12 of the panoramic type on which are arranged a pair of wiper blades 13 for wiping movement thereupon. Each wiper blade is mounted upon a wiper arm 14 which is removably affixed to a wiper drive shaft, or rockshaft, 16 supported for both axial and oscillatory movements in bearing within a tubular housing 17 which is positioned adjacent the lower edge of the windshield as best seen in Fig. 4. A wiper motor 18 of the conventional vacuum operated type is affixed to a bracket 19 secured in part by the vehicle firewall 21 and underneath an instrument panel 22. A hose, or conduit, 23 is arranged to connect the wiper motor with a source of vacuum such as the engine intake manifold, while a motor control cable such as a Bowden wire 24 extends into the vehicle to afford convenient control of the wiper motor by the vehicle operator.

A connecting rod 26 pivotally mounted at one end to a crank arm 27 affixed to the drive shaft of the wiper motor 18, is connected to a crank pin, or ball stud 28 mounted near one end of a driving arm 29, the other end of the arm 29 being pivotally connected to a stub shaft 31 which is secured in a projection 17' formed integral with the tubular housing 17. On the ball stud, opposite to the side of the lever on cam 29 having the connecting rod, is a bushing 32 for the rotary support of a bearing 33 and a washer 34. The bearing 33 is maintained upon the bushing 32 by an end thrust washer 36 which is secured in position by peening the end of the ball stud 28. The bearing 33 engages a slot 37 formed near one end of a driven arm 38 on the rockshaft 16 to form a sliding connection, the other end of the driven member being rigidly affixed to the end of the wiper rockshaft 16. This pin and slot arrangement provides a driving connection with a variable leverage between the driving arm 29 and the driven arm 38. When the crank pin 28 is in the outer end of slot 37, as shown in the broken line position in Fig. 2, the effective length of the arm 38 is increased over what it would be if the pin 28 were fixedly located on the driven arm as in the earlier transmission which lacked the slot 37 and the link 29. This effective lengthening of the driven arm 38 will assist in returning the wiping blade up over the lateral and crest areas. It will further tend to control the outward descent of the blade on the lateral area.

Figure 2:
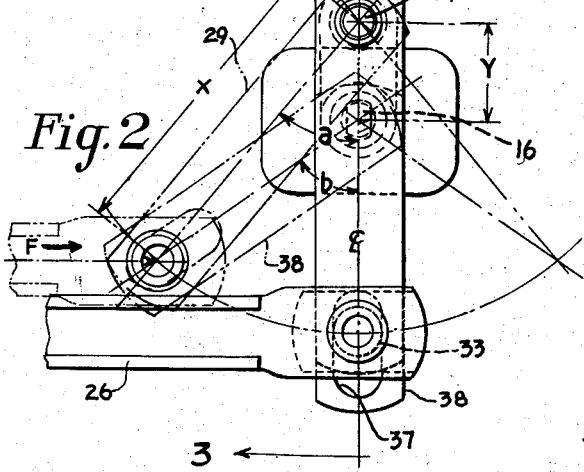
Fig. 2 is a view illustrating a linkage system used in the windshield wiper arrangement illustrated in Fig. 1.

As best seen in Fig. 2, it will be apparent that longitudinal movement of the connecting rod 26 will result in angular movement of different amounts between the driving arm or lever 29 and the driven member 38. It will be further seen that the resulting torque imposed upon the rockshaft 16 by longitudinal movement of the connecting rod 26, will be the resultant force acting normal to the centerline of the driven member 38, times the effective moment arm thereof. A mathematical analysis of the arrangement of the members 29 and 38 will show that the torque generated upon the rockshaft at any position of angular movement may be worked out by a suitable equation.

The lever arrangement can be designed to provide a turning moment upon the rockshaft 16 even when the driven arm 38 is normal to the vertical centerline. In Fig. 6, a driven arm 40, having a slot 45 arranged to allow end clearance of the bearing 33 when the arm is at a right angle to the vertical centerline, is illustrated. As a matter of fact, it can be seen that a rockshaft arcuate movement of greater than 180° is possible by application of the principles of the present invention. With a conventional linkage arrangement, movement of a rockshaft lever to a position normal to the vertical centerline, would result in no torque load on the rockshaft whatsoever; and in addition, such extreme movement could result in linkage locking, or breakage, or passing over dead center by virtue of the inertia resident in the wiper arm and blade assembly. Furthermore, it is to be noted that with the linkage arrangement of the invention, the input angular movement, namely angle (a), will result in a larger output angle (b) for any given connecting rod movement, thus providing increased wiper arc travel with no increase in connecting rod throw.

Figure 1:
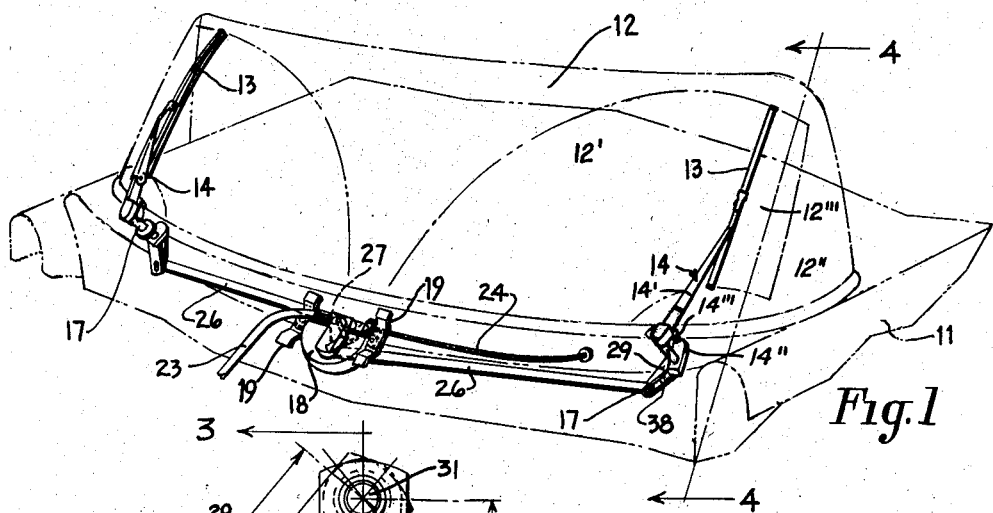
Fig. 1 is a fragmentary perspective view of a motor vehicle having a windshield wiper arrangement embodying the principles of the invention.

This construction is especially advantageous for cleaning windshields of the panoramic or wrap-around type, such as is shown in Fig. 1, the same having a frontal area 12', flanking lateral areas 12", and a crest area 12''' of relatively sharper curvature joining each lateral area to the frontal area. As each wiper blade moves outwardly onto its lateral area, from the midposition or solid line showing of Fig. 2 to the broken line position, it will be noted that the bearing 33 moves into the outer end of the slot 37 to increase the effective length of the driven arm 38 to thereby obtain a force multiplication and a resultant torque advantage in the end zone of blade travel. Thus, the driving connection between the driving arm 29 and the driven arm 38 provides an improved leverage that serves to multiply the transmitted torque in the end zone for bringing the wiper blades back up the lateral and crest areas and against the heavier slip stream of air currents over those areas of the curved windshield. The augmented torque is added where it is needed.

Figure 3:
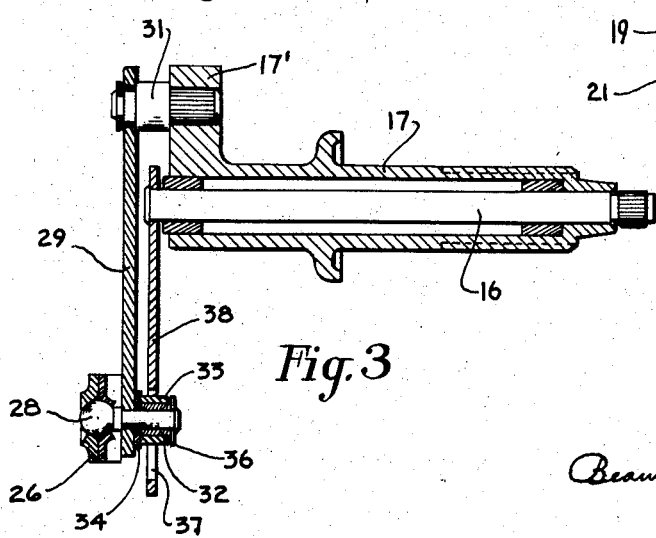
Fig. 3 is a section view as seen from line 3—3 in Fig. 2.

The wiper illustrated in Fig. 1 is of the blade normalizing type shown generally in Patents 2,691,186 and 2,781,540, wherein an outer blade carrying section 14' of the arm is rockable about an axis substantially longitudinally of the blade, and this rocking is controlled by a cam arrangement including a cam plate 14", fixed adjacent the rockshaft, and a follower 14''' on the arm section 14' which cooperates with the cam plate to hold the blade in a wiping attitude substantially normal to the surface being wiped while passing thereover. The cam plate 14" serves to limit the rocking of the arm section 14' sufficiently to maintain the blade in such normal wiping attitude as it moves around the crest portion 12''' in negotiating the panoramic pattern. As the follower 14''' rides back and forth over the normalizing cam 14", its rockshaft 16 will rise and fall, or rather, move in and out in its bearing support 17, Figs. 3 and 4, as a unit with the driven arm 38. To maintain the driving connection between the driving arm 29 and the driven arm 38 during this floating movement of the unit 14, 16, 38, the crank pin assemblage 28, 32, 33 is lengthened axially.

Fig. 5 illustrates the application of a windshield wiper arrangement embodying the principles of the invention to a motor vehicle having an electrically powered wiper motor 41 in which the driving ends of connecting rods 26 are attached to crank pins that move around a circular path instead of moving back and forth across an arc less than 180°. It will be apparent that the principles of the invention may be applied with equally satisfactory results to vehicles having electrically powered wiper motors.

The application of a linkage mechanism embodying the principles of the invention as applied to a flexible transmission system is illustrated in Figs. 7 and 8. In such an arrangement, a pulley 46 is affixed to the driving arm 29, which in this usage becomes a part of a driving lever, the center of said pulley coinciding with the center of shaft 31. A cable 47 is arranged to ride within the pulley groove 48, and connect to a wiper motor (not shown) in the usual manner resulting in reciprocal rotary motion of the pulley and rotary motion of the driving arm. The arm 29 has a stud 49 secured to the free end, which stud supports the bushing 32 and bearing 33, the latter of which engages the slot 37 formed in the end of the driven arm 38 to form a sliding connection. In such manner rotary motion of the driving lever 29, will cause rotary motion of the driven arm 38.

Figure 9:
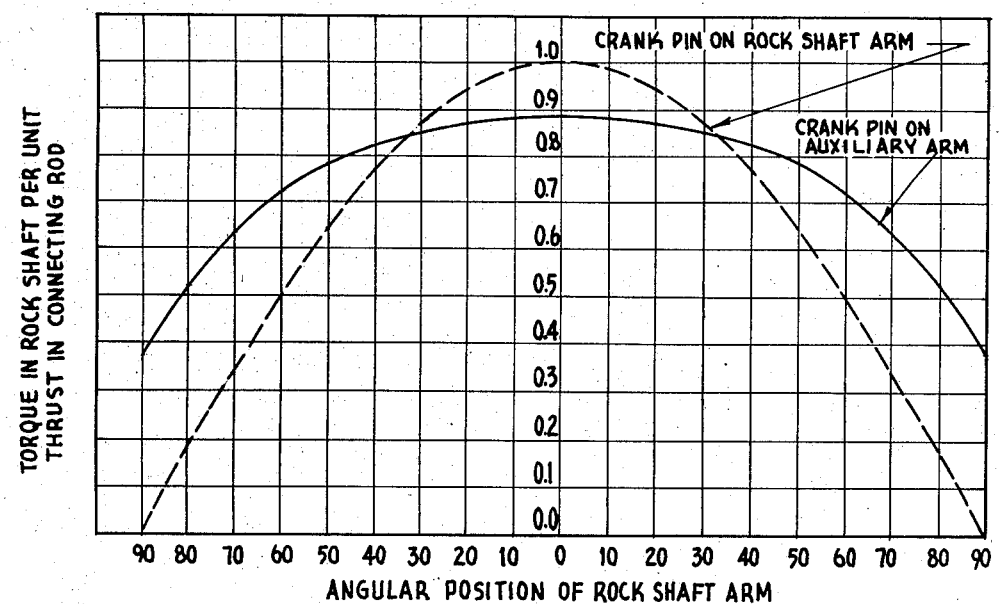
Figs. 9 and 10 are graphs illustrating operating characteristics of the wiper motor transmission system of the invention as compared with wiper motor transmission systems having a conventional linkage arrangement.

Referring now to Fig. 9, the operating characteristics of the linkage arrangement of the invention as compared to a conventional linkage arrangement, is graphically illustrated. The abscissa shows the angular position of the rockshaft arm relative to the vertical centerline, while the ordinate shows the ratio of torque developed in the rockshaft per unit thrust in the connecting rod. In the development of the graph, a constant input force of ten pounds was used with a rockshaft arm length of five and one-eighth inches (dimension $x$), and in addition, an eccentricity measurement (dimension $y$) of one and five-eighths inches was used for the linkage mechanism of the invention. It will be seen that with the conventional linkage arrangement, wherein the crank pin is on the rockshaft arm, a maximum ratio of 1.0 is realized at the zero angular position, while a zero ratio is realized at the 90° angular position. In other words, torque development in the conventional linkage arrangement goes from maximum at the center of arcuate movement, to zero at the extreme movement, i.e., 90° to the vertical centerline.

With the linkage arrangement of the invention, i.e., when the crank pin 28 is on the driving arm 29, it will be seen that the zero angular position, a ratio of almost 0.9 is realized, while at the 90° position a ratio of almost 0.4 is realized. Hence with the linkage arrangement of the invention there will be torque on the rockshaft at the 90° angular position, as compared with no torque in such position of parts with the conventional linkage arrangement. The linkage arrangement of the present invention, not only provides a greater torque upon the rockshaft in the end zones of travel, but in addition there can be a certain amount of torque even when the driven arm is normal to the vertical centerline, thus avoiding stalling, breakage, or rapid wear in those conditions where it is necessary that the driven arm approach or surpass, 180° of arcuate movement.

Figure 10:
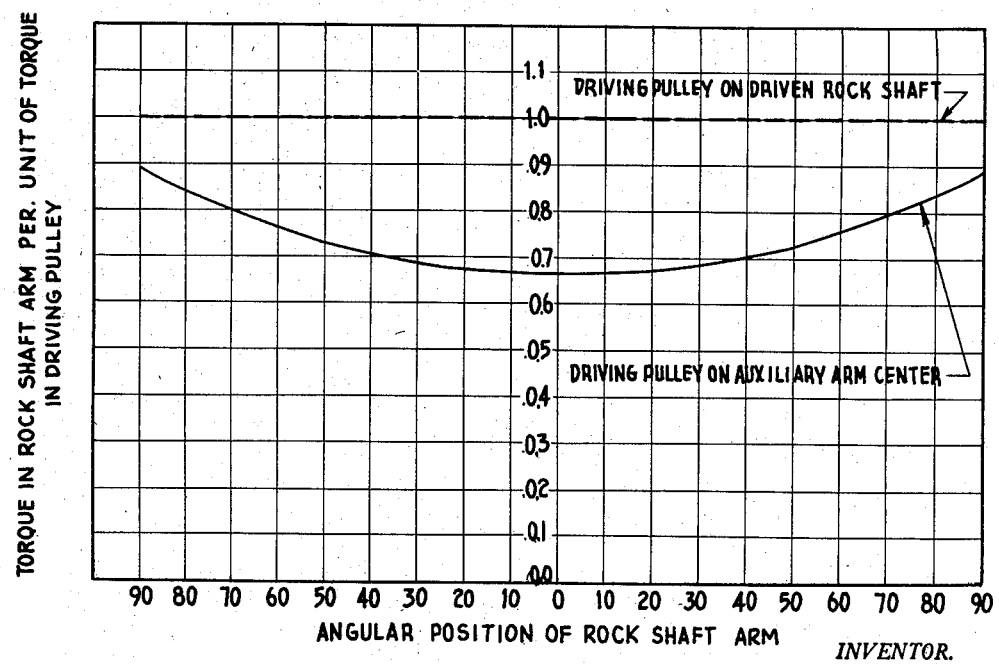

Referring to Fig. 10, the operating characteristics of the linkage arrangement of the invention using a flexible transmission, i.e., pulley and cable arrangement, is graphically illustrated in comparison with a conventional pulley driven rockshaft. This graph, which is similar to the graph of Fig. 9, differs in that the ordinate shows the torque in the rockshaft arm per unit of torque in the driving pulley. In the development of the graph, a constant input force (cable differential) of ten pounds was used with a pulley radius of five inches, a driving lever length of five inches (dimension $x$), and an eccentricity measurement of one and five-eighths inches (dimension $y$). It will be seen that with the conventional pulley driven rockshaft, the torque in the rockshaft per unit of torque in the driving pulley is constant (value of one) throughout the full range of angular positions of the rockshaft arm, while in the linkage arrangement of the invention, the ratio is approximately 0.67 at an angular position of zero, and approximately 0.89 at an angular position of 90° rockshaft travel. It will be further seen that the linkage arrangement of the invention, when used with a flexible transmission system, produces its minimum torque ratio at the zero angular position of the rockshaft arm, and a substantially greater torque ratio at the 90° angular position increasing gradually from the torque value at the centerline as movement progresses toward either of the extreme positions. Accordingly, the linkage arrangement of the invention provides increased torque development at end of rockshaft arcuate travel, which is very desirable since the load on the wiper arm is generally maximum at the end positions of arcuate movement.

From the foregoing it will be seen that the linkage arrangement of the invention provides improved operating characteristics in windshield wiper motion transmission systems of either the connecting rod type, or the pulley-cable type. More particularly, it provides a means whereby a conventional wiper motor may be used without change to achieve increased torque development on the wiper rockshaft at end positions of wiper travel, and in addition, wherein an increased wiper arc can be obtained up to, and exceeding 180° of arcuate movement, if desired with no harmful effects. Moreover, the arrangement of the wiper transmission system of the invention allows for greater variation in the distance between the wiper motor and each rockshaft without seriously effecting the predetermined wiping arc.

In summary, it will be observed that the above mechanism provides a camming drive at all of its positions except that of its centerline. The turning torque transmitted from the crankpin 28 on the operating arm to the driven arm on the wiper rockshaft is in the form of a direct push or pull when the longitudinal axis of the driving arm is passing across the extended axis of rotation of the driven arm and its wiper carrying rockshaft. At all other positions, the motion that is transmitted from the driving arm to the driven arm is partly by a camming action between the roller on the crankpin of the driving arm and the substantially radial side walls of the slot 37 within which this roller is functioning inwardly and outwardly from the center of the rockshaft oscillation. This camming action becomes of increasing value in its contribution of turning torque to the wiper rockshaft as the wiper rockshaft approaches the end positions of its travel. It should also be noted that the outward end of the slot 37 in the driven arm 38 serves as an effective limitation to angular positions of both driving arm 29 and driven arm 38. This feature would serve as a control for wiper blade over-travel, etc., if the normal operation were such as to bring the crankpin 28 close to the end of the slot 37 at the time the wiper travel is being reversed, but normally it is not relied upon during the running operation, but it serves to hold the parts in their operative relation during installation of the mechanism and during the handling of the mechanism prior to installation.

The foregoing description has been given in detail without thought of limitation since the inventive principles involved are capable of assuming other physical embodiments without departing from the spirit of the invention and the scope of the appended claims.

What is claimed is:

1. A cleaner for a curved wrap-around type of windshield having a frontal area flanked by a lateral area and joined thereto by a more sharply curved crest area, comprising a wiper, a rockshaft journaled adjacent the lower edge of the crest area of the windshield, a wiper motor for operating the rockshaft, and transmission means connecting the motor to the rockshaft and including a driven arm member fixed to said rockshaft and a longer driving arm member pivoted off-center from the rockshaft and having a connector in slidable engagement with the arm member to provide a variable leverage through which to oscillate the wiper, the arrangement being such that in the midpositions of the driving arm member and the driven arm member their longitudinal axes are coplanar along with their axes of oscillation, there being a driving connecting rod extending substantially normal to such common plane when said members are in their midpositions, for affording a greater leverage to produce more torque at points adjacent the wiper reversal on the lateral area for aiding in moving the wiper up and off the lateral area on its return stroke to the frontal area.

2. A cleaner for a curved wrap-around type of windshield having a frontal area flanked by a lateral area and joined thereto by a more sharply curved crest area, comprising a wiper, a rockshaft journaled adjacent the lower edge of the windshield, a wiper motor for operating the rockshaft, and transmission means connecting the motor to the rockshaft and including a driven arm member fixed to said rockshaft and a longer driving arm member pivoted off-center from the rockshaft and having a connector in movable engagement with the driven arm member to provide a variable leverage through which to oscillate the wiper, the arrangement being such that in the midpositions of the driving arm member and the driven arm member their longitudinal axes are coplanar along with their axes of oscillation, there being a driving connecting rod extending substantially normal to such common plane when said members are in their midpositions, for affording a greater leverage to produce an augmented torque at points adjacent the wiper reversal on the lateral area for aiding in moving the wiper up and off the lateral area on its return stroke to the frontal area.

3. A windshield cleaner according to claim 2 wherein said members have relative movement in the direction of the axis of the rockshaft.

4. A vehicle windshield wiper system for driving a wiper blade across a curved windshield and maintaining the attitude thereof substantially normal to said curved windshield, comprising a rockshaft mounted for oscillatory and axial movement, a wiper arm mounted on said rockshaft, a windshield wiper blade mounted on said wiper arm, a member on said arm receiving guidance from a stationary part on the vehicle for normalizing the attitude of said blade relative to various portions of a windshield, a longer driving arm pivotally mounted for oscillation about an axis which is spaced from and substantially parallel to the axis of said rockshaft, motor means, motion transmitting means coupled to said motor means, a driven arm coupled to said rockshaft, means for coupling said driving arm and said motion transmitting means while permitting relative movement therebetween, and means coupled between said driving arm and said driven arm for transmitting motion to said crank arm while permitting axial movement of said rockshaft.

5. A cleaner for a curved windshield having a frontal area and a lateral area, comprising in combination therewith, a wiper, a rockshaft journaled adjacent the lower edge of the windshield, a wiper carrying arm on the outer end of the rockshaft, driving means for the rockshaft, and transmission means connecting the driving means to the rockshaft and including an oscillating driven arm operatively connected to the rockshaft, a longer oscillating driving arm pivoted off-center from the pivot axis for the driven arm, and a motion transmitting connection between the driving and driven arms, and a driving member pivotally connected to the driving arm and reciprocating uniformly in a path extending across and lying substantially normal to the plane of the two axes of oscillation, said motion transmitting connection including a motion transmitting part movable by said driving arm relative to said driven arm to increase the effective length of the driven arm as the oscillating wiper moves outwardly on the lateral area for making available an augmented torque for returning the wiper from the lateral area against air flow thereover.

References Cited in the file of this patent

UNITED STATES PATENTS

| | | |
|---|---|---|
| 2,651,802 | Kearful | Sept. 15, 1953 |
| 2,691,186 | Oishei et al. | Oct. 12, 1954 |

FOREIGN PATENTS

| | | |
|---|---|---|
| 617,261 | France | Nov. 19, 1926 |
| 716,825 | Germany | Jan. 30, 1942 |